United States Patent [19]

Stevens

[11] 4,435,705
[45] Mar. 6, 1984

[54] DATA TRANSMISSION SYSTEMS

[75] Inventor: Reginald W. Stevens, Stockport, England

[73] Assignee: International Computers Limited, Stevenage, England

[21] Appl. No.: 348,942

[22] Filed: Feb. 16, 1982

[30] Foreign Application Priority Data

Feb. 18, 1981 [GB] United Kingdom ............... 8105133

[51] Int. Cl.³ ............................................ H04Q 9/00
[52] U.S. Cl. ................................ 340/825.05; 370/86; 375/36
[58] Field of Search .......... 340/825.05, 310 R, 310 A; 375/46, 52, 8, 4, 36; 370/86, 91; 455/14, 15; 371/32

[56] References Cited

U.S. PATENT DOCUMENTS

| 3,582,782 | 6/1971 | Danielsen | 455/14 |
|---|---|---|---|
| 3,744,051 | 7/1973 | Sanders et al. | 375/36 |
| 4,042,783 | 8/1977 | Gindi | 370/86 |
| 4,078,228 | 3/1978 | Miyazaki | 370/86 |
| 4,086,534 | 4/1978 | Olson | 375/36 |
| 4,121,050 | 10/1978 | Witt | 375/36 |
| 4,199,662 | 4/1980 | Lowe, Jr. | 370/91 |
| 4,304,001 | 12/1981 | Cope | 371/32 |

FOREIGN PATENT DOCUMENTS 55-136746 10/1980 Japan ................................ 370/86

*Primary Examiner*—Donald J. Yusko
*Attorney, Agent, or Firm*—Lee, Smith & Jager

[57] ABSTRACT

A communicating network in which encoder/decoders are joined in a ring by transmission links. Data passes over the links as a carrier having two cycles per bit period. The amplitude of the carrier in any bit period is non-zero and represents the value of the bit. In each encoder/decoder the carrier is recovered by a tuned circuit, the clock is recovered by dividing the carrier and the data is recovered. The same carrier is remodulated with the output data. The whole system forms an oscillatory system which sustains the carrier at a frequency which varies if the properties of the ring change.

The specification also describes the use of a modulated carrier in conjunction with a filter blocking frequencies below 25 MHz to give good noise immunity.

7 Claims, 10 Drawing Figures

DATA TRANSMISSION SYSTEMS

BACKGROUND OF THE INVENTION

This invention relates to data transmission systems. In its first aspect it is concerned with systems in which a number of transmission links are connected in sequence. Such systems have been used, for example, in networks for connecting computer processors and high-speed peripherals, especially with the communicating devices being arranged in a ring or loop. Systems of this latter kind are described for example in "An introduction to local area networks" by D. D. Clark, K. T. Pogran and D. P. Reed in Proceedings of the IEEE, November 1978, pages 1497 to 1516.

The transmission links are commonly connected to apparatus which passes data to or from an associated device which wishes to communicate over the system. In this apparatus it is usually necessary to extract a clock signal which is also used in retransmitting data onto the next transmission link. In this manner a chain of clock signals are derived, and it is found that at the end of a long sequence timing difficulties can arise which limit the number of consecutive stages possible. For example, if phase-locked loops are used each stage produces a residual clock jitter which can accumulate from stage to stage. The difficulties are especially great if the system is connected back on itself in a ring.

SUMMARY OF THE INVENTION

This invention provides a system comprising a plurality of encoder/decoders each connected to an incoming transmission link and an outgoing transmission link, the transmission links connecting the encoder/decoders in a closed ring, in operation data being transmitted across each transmission link from one encoder/decoder to another as a signal combining the carrier and the data, each encoder/decoder being arranged to recover from the signal received over its incoming transmission link the carrier and a data signal, to recombine the carrier with a data signal and to transmit the resulting signal onto its outgoing transmission link, the encoder/decoder thereby providing a path for the carrier from its incoming transmission link to its outgoing transmission link, and each such path together with the intervening transmission links providing a single closed path around which in operation signals containing the carrier circulate, the ring is a whole acting in operation as an oscillatory system to sustain the carrier without the simultaneous injection of carrier into the said closed path from any source external to the path, the carrier being sustained at a frequency constant around the ring but free to vary with time in dependence on the characteristics of the ring and such as to give an integral number of carrier cycles around the said closed path.

The second aspect of the invention is concerned with a method of data transmission usable in such systems. It provides a method of data transmission in which data is transmitted across a link comprising at least one conductor as the combination of a carrier and the data and at the end of the transmission link frequencies below 25 MHz are substantially completely filtered out.

We have found that substantially all the electromagnetic noise induced in conductive transmission lines in circumstances such as those in which networks connecting data processing equipment are used is below 25 MHz. The method therefore allows data to be transmitted with good noise immunity using a carrier at a higher frequency.

Data may be carried by the method at rates so great that they would otherwise require the use of optic fibres. On the other hand lower data rates may be used by suitable modulation. The good noise immunity allows very low voltages to be used in generating the signal to be transmitted.

Any suitable method of combining or modulating the carrier with the data signal may be used.

BRIEF DESCRIPTION OF THE DRAWINGS

An example of a system in accordance with the first aspect of the invention and using the method of the second will now be described in greater detail by way of example with reference to the accompanying drawings, in which.

DESCRIPTION OF THE PREFERRED EMBODIMENT

Overall System

Figure 1:
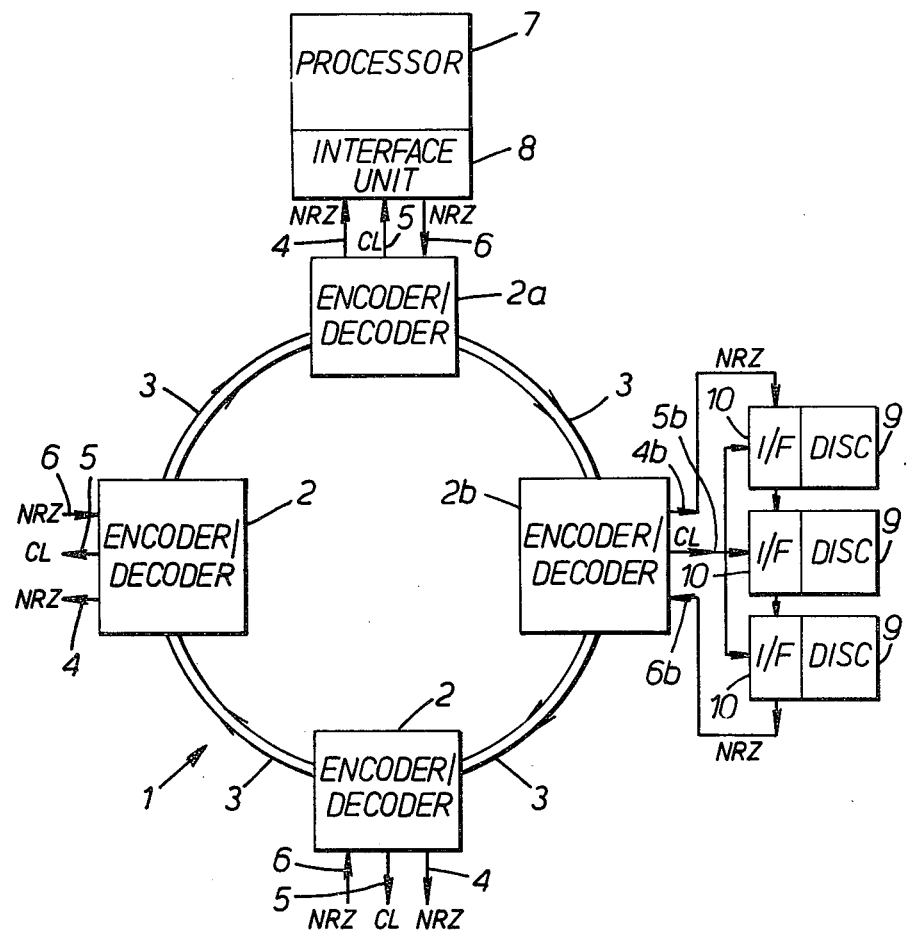
FIG. 1 is a diagram of the overall system.

Referring to FIG. 1, this data transmission system may be used as a network for interconnecting communicating units such as one or more processors and one or more high-speed peripherals, for example disc storage units. The system has a central ring 1 consisting of encoder/decoders 2 interconnected by transmission links 3 of coaxial cable. The encoder/decoders 2 act as interfaces to the ring 1 for communicating units that are connected to them. Data transmission takes place serially over each link 3 in the form of a modulated carrier. The transmission is in one direction only, as shown by the arrows.

Each encoder/decoder 2 receives the data transmitted over its incoming link and demodulates it to recover the data in a non-return to zero (NRZ) format which it outputs to its attached communicating unit or units on a connection 4. It also recovers an accompanying clock signal which it outputs on a connection 5. It receives data in the same NRZ format from its attached communicating unit or units on a connection 6. It remodulates the carrier with this data to produce the signal output on its outgoing link 3.

Each encoder/decoder 2 may act as the interface for a single one of the communicating units. As an illustration the encoder/decoder 2a is shown connected to a single processor 7 through an interface unit 8. Alternatively, it may act as the interface for a number of such units through a subsidiary NRZ serial data loop. As an illustration, the encoder/decoder 2b is shown connected to disc storage units 9 through interface units 10 which are connected in a loop which starts as the connection 4b and returns as the connection 6b. Clock signals are distributed on lines 5b directly to each interface unit 10.

The communicating units may use any suitable protocol for exchanging messages, such as those described in the above-mentioned paper by Clark et al. As an example, the data path may form a closed ring, with a control token passed from unit to unit as a go-ahead for transmission. (The data path diverts from the central ring 1 at each encoder/decoder 2 to loop through the unit or units for which it is the interface.)

Data transmission format

Figure 2:
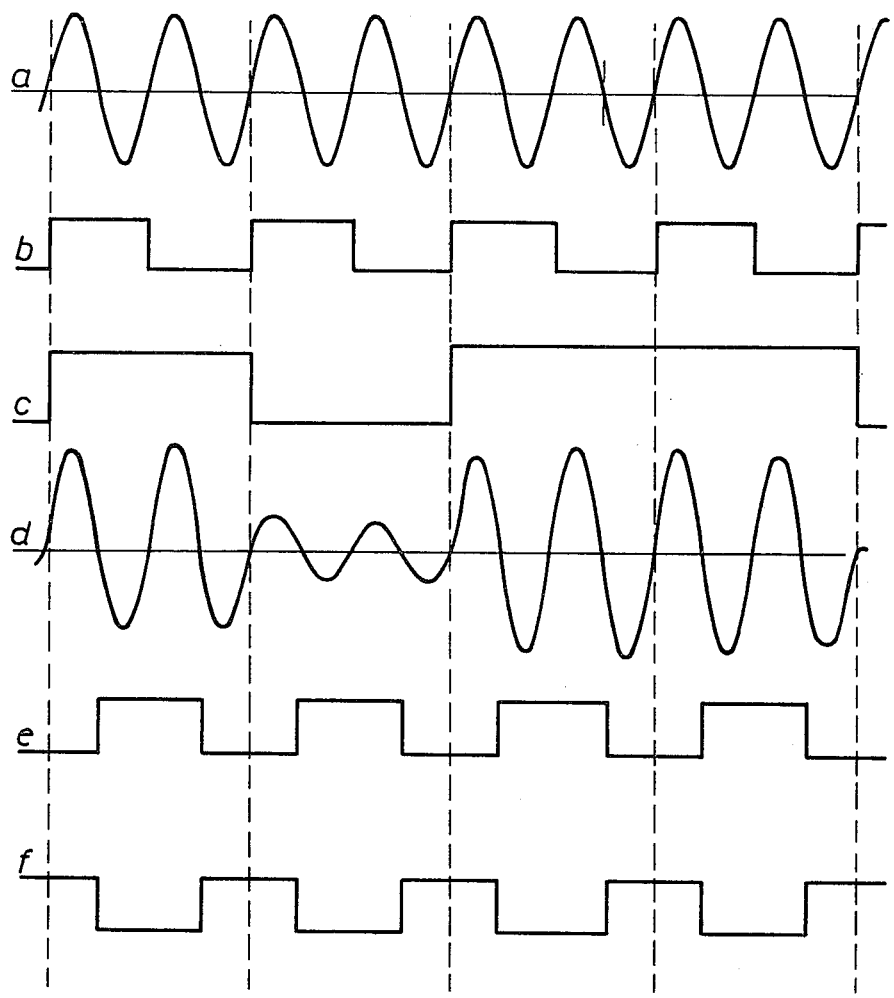
FIGS. 2a–2f shows in idealised form various waveforms used in the system.

FIG. 2 shows various of the waveforms required to generate the modulated carrier transmitted over the links 3. Waveform a is the unmodulated carrier, and waveform b is the clock signal, the rising edges of which define the bit periods as shown by the dotted lines. An example of the data in NRZ format is shown as waveform c; the signal level remains substantially constant at one of two fixed levels for the whole of each bit period.

The clock rate and the frequency of the carrier are related in such a way that each bit period contains a whole number of carrier cycles (two in this example). In other words the carrier frequency is an integral multiple of the clock rate, which for NRZ data is the inverse of the bit period.

As an example of suitable values, the clock rate may be 50 MHZ (and consequently the data rate 50 million bits per second) and the carrier frequency 100 MHZ.

The data signal is used to amplitude-modulate the carrier and the result is shown as waveform d. The level of modulation is chosen to give a significant difference between the amplitudes of the carrier when modulated by the two data levels, but nevertheless to give the carrier an appreciable amplitude even when modulated by the low data level.

We have found that, provided frequencies below 25 MHZ are filtered out, the modulated waveform passes over the links 3 with a relatively high immunity from electro-magnetically induced noise.

Encoder/Decoder

Figure 3:
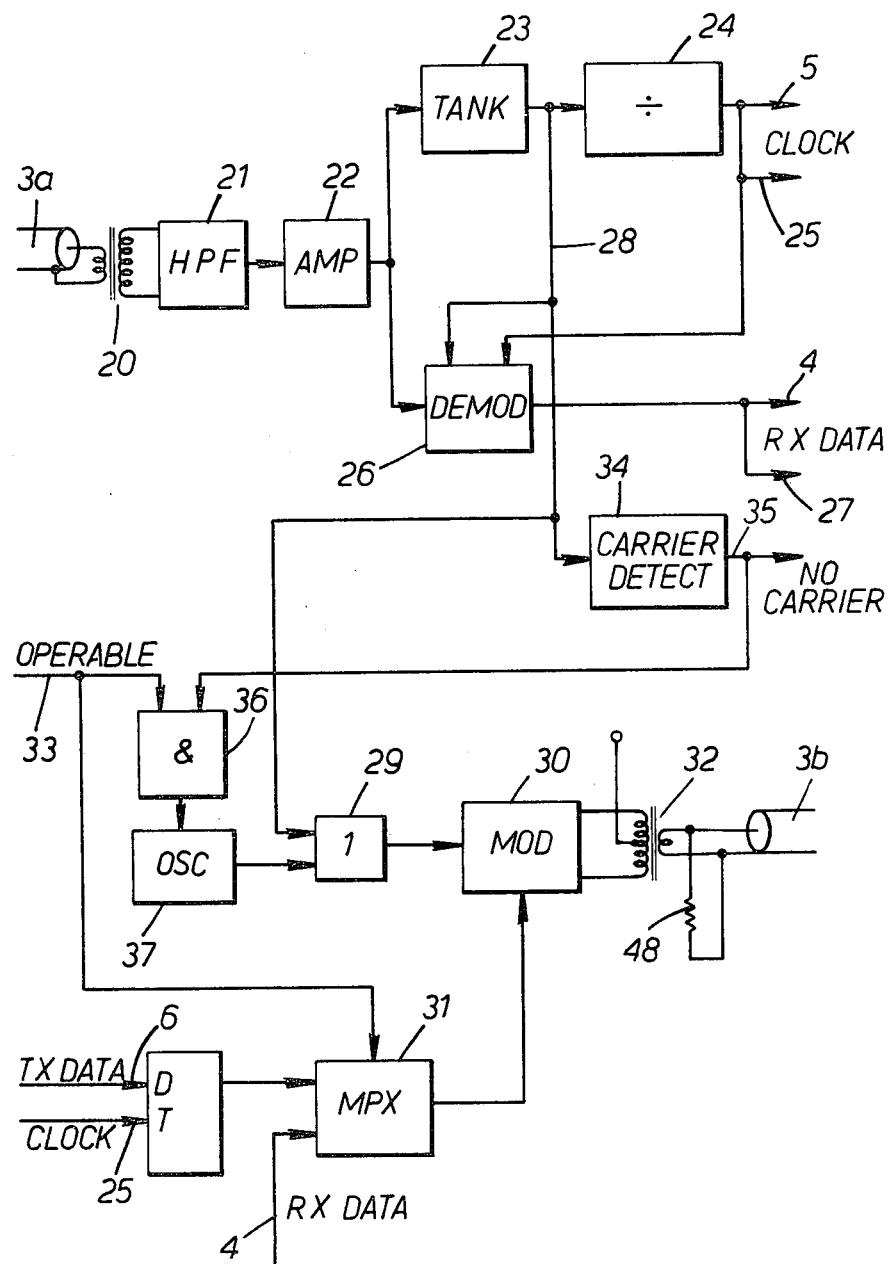
FIG. 3 is a block diagram of the encoder/decoder of the system.

Referring to FIG. 3, each encoder/decoder 2 is coupled to a coaxial cable 3a forming its incoming transmission link by a transformer 20 connected to a high-pass filter 21, for example, a two-stage constant K passive high-pass network, which provides the necessary blocking of frequencies below 25 MHZ. The signal is then amplified by an amplifier 22 and passed to a tank circuit 23 which contains a tuned circuit of medium Q (a suitable value is 20) tuned to the frequency of the carrier. Its output, squared, is passed to a divider circuit 24 which outputs the clock signal both on a line 25 for use within the encoder/decoder and on the connection 5 for supply to the associated communicating unit or units. It will be seen that the clock signal is very simply obtained. Because some amplitude of carrier is always present, the clock signal is always produced.

The output of the amplifier 22 is also passed to a demodulator 26 (described in more detail below) which recovers the original NRZ data and outputs it as the received data on the connection 4 to the associated unit or units. It is also supplied on a line 27 for use within the encoder/decoder 2.

Since the clock signal is obtained by dividing the carrier by two, it has two possible phases, depending on which of the two carrier cycles within a bit period acts as the starting point. The phases differ by half a bit period and it is arbitrary which phase is adopted at the moment when generation of the clock signal starts. The clock signal is, however, timed so that the strobing point occurs (depending on the phase adopted) either one quarter or three-quarters way through the bit period, and the data signal level will therefore be sensed away from the points at which the data signal level can change, whichever phase the clock signal adopts.

Taking waveform c of FIG. 2 to show the demodulated data signal, and assuming the rising edge of the clock signal is used for strobing, the two possible states of the clock signal are shown in FIG. 2 as waveforms e and f.

The carrier is also passed as a square waveform on a line 28 through an OR gate 29 to a modulator 30 (described in more detail below) where it is modulated by the outgoing data supplied from a multiplexer 31 in the same manner as described with reference to FIG. 2, and is then output through a transformer 32 onto a co-axial cable 2b forming the outgoing transmission link for the encoder/decoder 2. Because of the noise immunity of the system, voltages as low as 100 mV may be used. Such voltages may conveniently be generated by LSI techniques.

Provided a communicating unit attached to the encoder/decoder 2 is operable it sends a control signal to that effect on a line 33 and also, on the line 6, its data to be transmitted. The "operable" signal causes the multiplexer 31 to select this data for supply to the modulator 30, from where it is output in modulated form to the central ring 1 on the cable 3b. If there is no such operable communicating unit there is no "operable" signal on the line 33 and the multiplexer 31 is caused to select the data on the line 4, that is the data received by the encoder/decoder 2, as the data to modulate the carrier. In this case the encoder/decoder acts as a simple repeater. The ring 1 is therefore not disabled even if none of the communicating units for which it acts as an interface to the ring are operative.

To cope with a break in the ring 1 and the resultant loss of carrier, a carrier-detect circuit 34 is provided. It responds to the absence of the expected variation in signal level on the line 28 to output a signal indicating the absence of carrier on a line 35. This line passes to the attached communicating unit(s). It is also combined in an ANDed gate 36 with the "operable" line 33 and the output of the gate 36 enables a local oscillator 37 tuned to the carrier frequency and connected to the modulator 30 through the OR-gate 29. Hence if no carrier is detected on the ring 1 and an associated communicating unit is operable, locally generated carrier will be supplied instead and used by subsequent encoder/decoders. The operable communicating unit may then send a message to a monitoring station elsewhere in the system informing it that there is a break in the ring and, to help locate the break, of its identity as the first operable unit downstream of the break.

Modulator and demodulator

Figure 4:
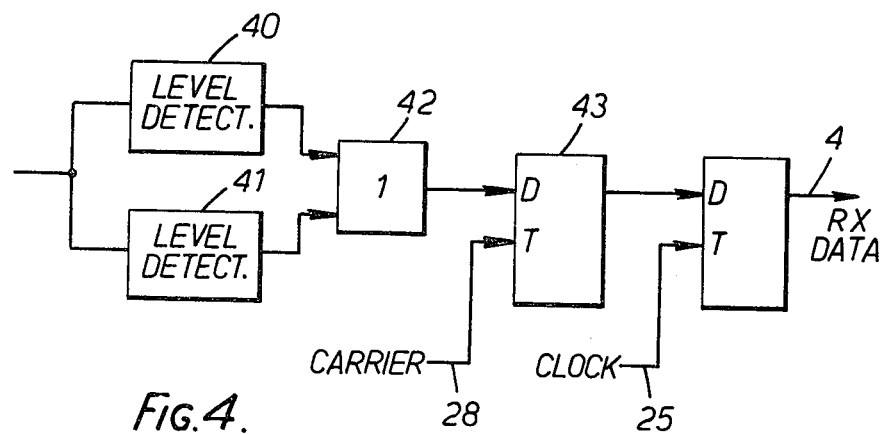
FIG. 4 is a block diagram of the demodulator of the encoder/decoder.

Although the demodulator 26 could be an integrator acting as an envelope detector in the conventional way, we prefer to use a digital demodulator, in view of the bandwidth required to recover the NRZ pulses. Referring to FIG. 4, the demodulator 26 has two level detectors 40 and 41, one of which outputs a pulse whenever the modulated carrier exceeds a threshold in the positive direction and the other a pulse whenever it exceeds a threshold in the negative directions. The thresholds are selected so that only the greater of the two modulated amplitudes is sufficient to produce these pulses. The outputs of the level detectors 40 and 41 are ORed by a gate 42 and used to set a D-type bistable 43 clocked by the recovered carrier. The output of the bistable 43 is in turn used to set another D-type bistable clocked by the data clock at, as has been explained, either the one-quarter or three-quarters point. The resultant output is the demodulated received data.

Figure 5:
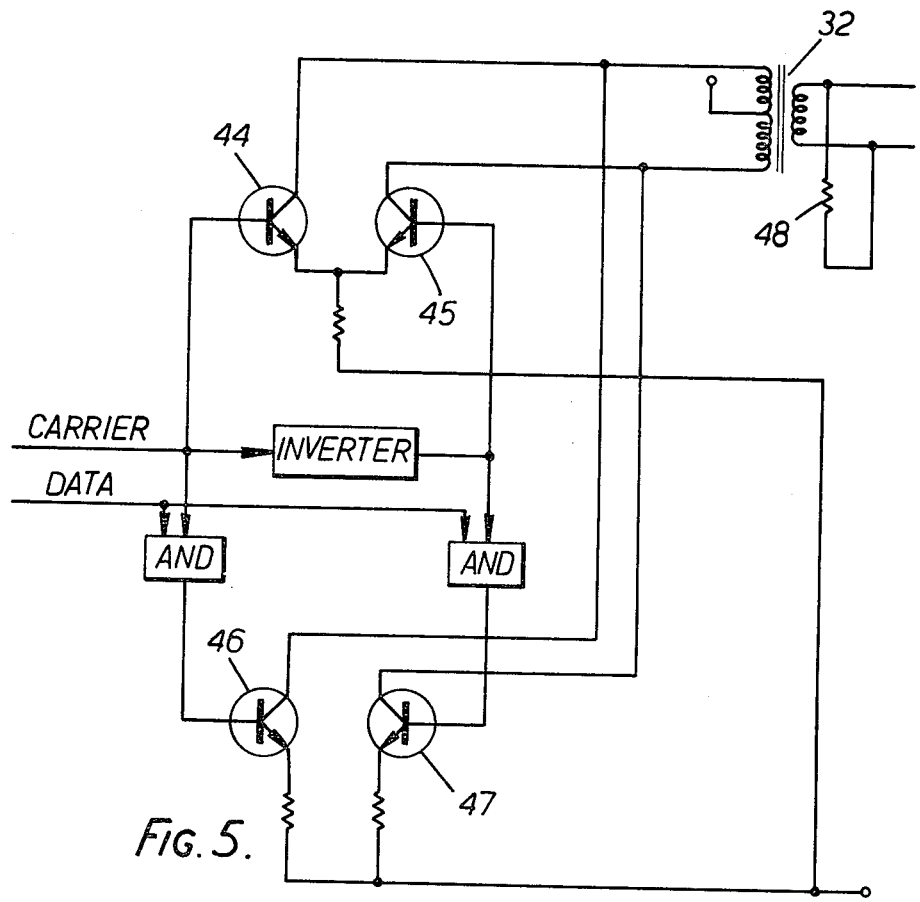
FIG. 5 is a block diagram of the modulator of the encoder/decoder.

Referring to FIG. 5 the modulator consists of four transistors 44–47 driving the transformer 32 in push-pull. Two transistors 44 and 45 operate at a low collector current, and continously transmit a residual carrier level. The other two transistors 46 and 47 operate at high collector current and only drive current through the output transformer in the presence of a logic 1. The secondary of the output transformer is shunted by a resistor 48 at the characteristic impedance of the line. This effectively series terminates the line; a necessity since the presence of the high pass filter at the far end of the line presents a high reactive impedance at low frequencies. Any reflections will be absorbed in the shunt. Its presence halves the available transmit amplitude; however the use of pushpull drive ensures more than adequate transmitter power. Isolation of the coaxial cable from the transmitter Ov by use of a transformer is not essential; however it enables the outer of the coaxial cable to be resistively terminated at the transmitter. Any noise induced on the cable outer sheath can thereby be absorbed thus improving the noise immunity.

Overall operation of the ring

In normal operation of the ring each encoder/decoder 2 detects carrier and its local oscillator 34 is not enabled. Hence there is a closed path for the carrier around the ring, passing along each link 2 and then, in each encoder/decoder 2, via the transformer 20, filter 21, amplifier 22, tank 23, modulator 30 and finally transformer 31 onto the next link 2. There is no external source simultaneously injecting a wave of the carrier frequency into this ring. But we have found that the carrier will nevertheless sustain itself because the whole ring acts as an oscillatory system. The approximate frequency is determined by the frequency to which the tanks 23 are tuned, but the exact frequency is determined by the ring as a whole and is such as to give an integral number of carrier cycles around the closed path of the carrier. In other words the carrier, after a complete circuit of the closed path, is in phase with itself.

The length of the closed path for the carrier is liable to vary, principally because the lengths of the cables 3 vary with temperature and age. If the carrier frequency were constant that would change the phase relationship after a complete circuit and impair or prevent the sustaining of the carrier waveform. However, we have found that the carrier frequency adjusts itself automatically to maintain an integral number of carrier cycles round the closed path. The data-clock rate will change correspondingly (over a small range) and is therefore also determined by the properties of the ring itself rather than any external equipment.

Not only is the carrier self-sustaining, but it is also capable of establishing itself spontaneously when the ring is first brought into operation, because of the oscillatory nature of the ring. However, although this property could be used in the system described, in fact it is not used, because of the presence of the local oscillators provided as a safeguard against the ring's breaking. When the ring is first switched on they will all be enabled by the absence of any incoming carrier and each will inject its own carrier into the ring. But as each encoder/decoder detects incoming carrier its oscillator will be disabled, and finally the carrier will be left in its selfsustaining mode with no independent external source. At this point the communicating units using the ring can start to pass messages.

Considerable problems have been experienced in previous attempts to close a communications ring. For example, if phase-locked oscillators are used to derive the required clock signals, the clock jitter occurring at each oscillator is compounded from stage to stage and causes stability problems that can limit the number of stages possible. We find that deriving the clock signal from the modulated carrier avoids this problem and leads to a stable system in which the number of stages is not limited in this way.

And if the data path itself is closed so that data can loop through all the encoder/decoders, for example to allow messages to make a complete circuit of the data path, the additional requirement exists that data which has made a complete circulation of the data path must still be in phase with itself. This has been expressed as the requirement that there should be an integral number of bits on the closed data path, and it has been proposed to insert a special device acting in effect as an elastic buffer to provide the required synchronism.

We find that the system described allows complete circulation of bits with no such device. The reason is as follows. Data that has made a complete circulation can in any case be in only one of two phase relationships with its earlier passage, that is in phase or 180° out of phase, since there must be an integral number of carrier cycles round the closed path and there are two carrier cycles per bit. However, even though data can enter an encoder/decoder in either of two states differing in phase by half a bit, this difference is accommodated within the encoder/decoder by the clocking method described which strobes the data away from an edge, and the resultant data signal is in phase with its previous passage.

Although FIG. 1 shows the carrier and modulated waveform in idealised form as sinusoids, the modulator 30 in fact receives the carrier as a square waveform and outputs it in modulated form likewise as a square waveform, each pair of cycles having one of two amplitudes depending on the value of the modulating data. However, the various following components, including in particular the transmission cable, are bandwidth-limited and serve to round the waveform towards that shown in waveform d of FIG. 1. This rounding is no disadvantage since the demodulating method does not need to sense edges but rather amplitude of the carrier.

Therefore the limits on the acceptable lengths of cable used do not depend on the extent the shape is changed, but only on the overall drop in level. If that falls to an unacceptably small level analogue amplification may be used to restore it: no digital regeneration is required.

As has been mentioned, for good noise immunity substantially all the frequencies below 25 MHz should be filtered out at the entrance to each encoder/decoder. As an example, with a carrier frequency of 100 MHz and a bit rate of 50 MHz and using a filter as described, the attenuation may be 30 dB at 25 MHz, with the 3dB point at 50 MHz. The lowest frequency that must be substantially completely passed is the carrier frequency less half the bit rate—75 MHz for the example given. For good noise immunity the two rates and the filter are selected with this criterion and the need to allow substantially complete attenuation at 25 MHz in mind.

Modifications

Various modifications may be made to the system described.

There may be other than two carrier cycles per bit. Assuming that the carrier frequency is kept constant, the divider 24 may in fact be a chain of divide-by-two circuits, a particular output of which is selected by a multiplexer to give a desired data rate. Smaller data rates for a given carrier require small bandwidths and allow a longer link between units. One bit per cycle is possible but has a rather wide bandwidth, leading to rather short maximum permissible links. Preferably the carrier is at least 50 MHz, frequencies below 25 MHz being filtered out. But if good noise immunity is not required, lower frequencies may be used and the filter omitted.

For high date rates the encoders/decoders may output clock and NRZ data in a two-phase form. The clock signal is split into two half-rate signals in antiphase with one another and the data is split into two signals one the result of strobing the data with one of these clock signals and the other the result of stroking it with the other of these clock signals. In the interface inputs 8 and 10 the two phases of data are combined by strobing each with its own phase of clock signal. This arrangement increases the latitude for timing uncertainties such as are especially likely to occur if TTL logic is used in the interface units 10. Data may then similarly be returned from the interface in two-phase form.

In place of the described ring configurations the encoder/decoders may be connected in an open loop or multidrop configuration. In that case the first encoder/decoder in the network can generate the carrier as a master, or an external source may be used, and the remainder will follow its frequency as slaves. An alternative arrangement for a closed data ring does not use the self-sustaining feature described but rather uses a separate oscillator as a master source and closes the ring with a first-in first-out buffer which accommodates part-bit phase differences. Data is clocked into the buffer by a received clock and out of it by the master clock. Intervening encoder/decoders and transmission links are as described above with, possibly, the addition of fibre optic links.

An alternative method of combining the data with the carrier for transmission over the links 3 also uses a carrier with two cycles per bit. The format is bipolar: starting from a carrier oscillating between 0 and a positive level, to represent one binary value one of the positive-going excursions is inverted; to represent the other the other positive-going excursion is inverted. The carrier is then recovered by rectification.

I claim:

1. A data transmission system comprising a plurality of encoder/decoders and a plurality of transmission links each for the transmission of a signal combining a carrier and a data signal, each encoder/decoder being connected between an incoming one and an outgoing one of the said transmission links and the said transmission links connecting the encoder/decoders in a closed ring;

each encoder/decoder comprising means for recovering an input data signal and the carrier from the signal received from its incoming transmission link and means connected to receive the recovered carrier and an output data signal for combining the carrier and the output data signal for output onto its outgoing transmission link, the encoder/decoder thereby providing a path for the carrier from its incoming to its outgoing transmission link;

each such path together with the transmission links providing a single closed path for circulation of the carrier which path is subject to variation in its length; and the ring as a whole forming a single oscillatory system which sustains the carrier once initiated without the simultaneous injection of carrier into the said closed path from a source outside the said closed path at a frequency constant around the ring but free to vary with time in dependence of the length of the closed path and such as to give an integral number of carrier cycles around the ring.

2. A system as claimed in claim 1, in which the means in each encoder/decoder for the recovery of the input data signal and the carrier includes a tuned circuit for recovering the carrier.

3. A system as claimed in claim 1, in which the combined signal receiver at each encoder/decoder has an integral number greater than one of carrier cycles in each bit period and each encoder/decoder includes means for recovering a clock signal of a period equal to the said bit period by division of the recovered carrier.

4. A system as claimed in claim 3, in which in each encoder/decoder the said means for recovering the clock signal is free to adopt anyone of the possible sets of carrier cycles separated from one another at the bit period as the initial carrier cycles of each bit period.

5. A system as claimed in claim 1, in which there are an integral number of carrier cycles greater than one in each bit period and each encoder/decoder includes means for deriving a clock signal from the signal received over its incoming transmission link, means for producing an initial demodulated data signal from the signal received over its incoming transmission link, the phase of which relative to the clock signal is free to adopt any one of a number of possible values equal to the number of carrier cycles per bit period and means for producing a final synchronised data signal by strobing the initial data signal with the clock signal, the various possible phases of the initial data signal being so related to the clock signal that for each possible phase the strobing takes place away from possible transitions in the level of the initial data signal.

6. A system as claimed in claim 5, in which the data path is closed so that it is possible for bits to make a complete circulation around the data path.

7. A system as claimed in claim 1, in which the waveform of the modulated carrier consists in the period of a bit of one value of a cycle, or a plurality of cycles, and in the period of a bit of the other value of an equal number of cycles the amplitude or amplitudes of which is or are non-zero but less than the amplitude of the or each cycle in a bit period of the first value.

* * * * *